United States Patent
Choi et al.

(10) Patent No.: US 10,816,932 B2
(45) Date of Patent: Oct. 27, 2020

(54) APPARATUS FOR DISPLAYING A HOLOGRAM

(71) Applicant: LG DISPLAY CO., LTD., Seoul (KR)

(72) Inventors: Dongjun Choi, Paju-si (KR);
Joonyoung Park, Paju-si (KR);
Juseong Park, Goyang-si (KR);
Minsung Yoon, Paju-si (KR);
Wooyoung Choe, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 341 days.

(21) Appl. No.: 14/086,065

(22) Filed: Nov. 21, 2013

(65) Prior Publication Data
US 2014/0176671 A1 Jun. 26, 2014

(30) Foreign Application Priority Data
Dec. 26, 2012 (KR) .......................... 10-2012-0153826

(51) Int. Cl.
*G03H 1/08* (2006.01)
*G02F 1/29* (2006.01)
(Continued)

(52) U.S. Cl.
CPC ........... *G03H 1/08* (2013.01); *G02B 27/0093* (2013.01); *G02F 1/29* (2013.01); *G03H 1/2205* (2013.01);
(Continued)

(58) Field of Classification Search
None
See application file for complete search history.

(56) References Cited

U.S. PATENT DOCUMENTS 4,574,282 A * 3/1986 Crossland ............ G03H 1/2294
345/87
4,824,212 A * 4/1989 Taniguchi ......... G02F 1/134336
345/103
(Continued)

FOREIGN PATENT DOCUMENTS

CN 102799021 A 11/2012
DE 10 2008 058 423 A1 6/2009
(Continued)

OTHER PUBLICATIONS

Office Action issued in Taiwanese Patent Application No. 102126928, dated Sep. 26, 2014, 8 pages.
(Continued)

*Primary Examiner* — Jayanti K Patel
*Assistant Examiner* — Stefan Gadomski
(74) *Attorney, Agent, or Firm* — Seed IP Law Group LLP

(57) ABSTRACT

An apparatus for displaying a hologram comprises: a hologram display panel that represents light having the hologram images to an observer; a detecting camera that decides a position of the observer; a deflector that forms a prism pattern to refract the light corresponding to the detected position of the observer; and a deflector driver that supplies a driving voltage corresponding to a inclined angle for forming the prism pattern, wherein the deflector includes: a plurality of first electrodes running to a first direction and divided into a plurality of electrode groups; a plurality of connection electrodes running to a second direction crossing with the first direction, and connecting same numbered first electrodes of the electrode groups, wherein each end of the connection electrodes forms a pad portion; and a second electrode facing to the plurality of the first electrodes with a liquid crystal cell therebetween.

8 Claims, 8 Drawing Sheets

(51) Int. Cl.
*G03H 1/22* (2006.01)
*G02B 27/00* (2006.01)

(52) U.S. Cl.
CPC ..... *G03H 1/2294* (2013.01); *G02F 2001/291* (2013.01); *G03H 2001/2236* (2013.01); *G03H 2226/05* (2013.01)

(56) References Cited

U.S. PATENT DOCUMENTS

| | | | |
|---|---|---|---|
| 5,093,740 A | 3/1992 | Dorschner et al. | |
| 5,311,220 A * | 5/1994 | Eichenlaub | G02B 27/0093 345/6 |
| 5,471,327 A * | 11/1995 | Tedesco | G02B 5/0252 349/64 |
| 5,625,253 A * | 4/1997 | Van Gorkom | G09G 1/20 313/361.1 |
| 5,654,782 A * | 8/1997 | Morokawa | G02F 1/134336 349/143 |
| 5,812,229 A * | 9/1998 | Chen | G02F 1/133553 349/113 |
| 5,886,799 A * | 3/1999 | Molteni | G02B 5/0252 349/113 |
| 5,943,159 A * | 8/1999 | Zhu | G02F 1/292 359/254 |
| 6,075,557 A * | 6/2000 | Holliman | G02B 27/225 348/169 |
| 6,233,819 B1 * | 5/2001 | Tsubakida | B41J 2/395 29/603.01 |
| 6,263,088 B1 | 7/2001 | Crabtree et al. | |
| 6,456,419 B1 * | 9/2002 | Winker | G02B 27/0087 250/227.17 |
| 6,469,822 B1 * | 10/2002 | Zhu | G02F 1/292 349/202 |
| 6,480,307 B1 * | 11/2002 | Yang | G02B 5/0215 349/65 |
| 6,490,076 B2 * | 12/2002 | Pepper | G02F 1/13471 359/279 |
| 6,618,189 B2 * | 9/2003 | Tangonan | F41G 7/008 359/245 |
| 6,643,054 B1 * | 11/2003 | Weidlich | G02F 1/21 359/260 |
| 6,646,375 B1 * | 11/2003 | Nagano | H01J 11/12 313/582 |
| 7,148,859 B2 | 12/2006 | Suyama et al. | |
| 7,688,349 B2 | 3/2010 | Flickner et al. | |
| 7,929,098 B2 * | 4/2011 | Koishi | G02F 1/1345 349/142 |
| 8,368,981 B2 * | 2/2013 | Gruhlke | G02B 6/0035 359/15 |
| 8,854,423 B2 * | 10/2014 | Batchko | H04N 13/0488 348/40 |
| 8,864,310 B2 | 10/2014 | Gross et al. | |
| 9,275,567 B2 * | 3/2016 | Kang | G09G 3/003 |
| 9,883,171 B2 * | 1/2018 | de la Barre | H04N 13/0404 |
| 2002/0145701 A1 * | 10/2002 | Sun | G02F 1/134309 349/200 |
| 2002/0149731 A1 * | 10/2002 | Slikkerveer | G02F 1/1345 349/153 |
| 2004/0201891 A1 * | 10/2004 | Schrader | G02B 5/1828 359/558 |
| 2006/0098296 A1 * | 5/2006 | Woodgate | G02B 27/2214 359/642 |
| 2006/0250671 A1 * | 11/2006 | Schwerdtner | G03H 1/2286 359/9 |
| 2007/0195410 A1 * | 8/2007 | Yun | G02B 27/2214 359/464 |
| 2007/0258139 A1 * | 11/2007 | Tsai | G02B 27/2214 359/462 |
| 2008/0061701 A1 * | 3/2008 | Lee | H05B 41/282 315/9 |
| 2008/0122999 A1 * | 5/2008 | Tsuchiya | G02F 1/1395 349/33 |
| 2009/0020428 A1 * | 1/2009 | Levitan | B01L 3/502761 204/547 |
| 2009/0122210 A1 * | 5/2009 | Im | G02B 27/2228 349/15 |
| 2009/0153653 A1 * | 6/2009 | Lee | G02F 1/13471 348/59 |
| 2010/0027083 A1 * | 2/2010 | Kroll | G03H 1/02 359/9 |
| 2010/0097535 A1 * | 4/2010 | Inoue | G02F 1/133707 349/38 |
| 2010/0103485 A1 * | 4/2010 | Haussler | G03H 1/02 359/9 |
| 2010/0149139 A1 * | 6/2010 | Kroll | G02B 26/0875 345/204 |
| 2010/0149473 A1 * | 6/2010 | Guo | G02F 1/1345 349/122 |
| 2010/0157399 A1 * | 6/2010 | Kroll | G03H 1/02 359/11 |
| 2010/0214634 A1 | 8/2010 | Kroll et al. | |
| 2011/0032346 A1 * | 2/2011 | Kleinberger | H04N 13/0404 348/59 |
| 2011/0043717 A1 * | 2/2011 | Valyukh | G02F 1/29 349/33 |
| 2011/0102423 A1 * | 5/2011 | Nam | H04N 13/0404 345/419 |
| 2011/0122355 A1 * | 5/2011 | Matsumuro | G02F 1/136227 349/143 |
| 2011/0149018 A1 * | 6/2011 | Kroll | G03H 1/02 348/40 |
| 2011/0216171 A1 * | 9/2011 | Barre | H04N 13/04 348/51 |
| 2011/0267553 A1 * | 11/2011 | Kim | G02F 1/1391 349/41 |
| 2011/0267564 A1 * | 11/2011 | Kim | G02F 1/1395 349/86 |
| 2011/0304613 A1 * | 12/2011 | Thoresson | H04N 13/0402 345/419 |
| 2011/0309908 A1 * | 12/2011 | Ando | G06F 3/0338 338/47 |
| 2011/0310092 A1 * | 12/2011 | de la Barre | H04N 13/0409 345/419 |
| 2011/0316987 A1 * | 12/2011 | Komoriya | G06K 9/00228 348/51 |
| 2012/0013651 A1 * | 1/2012 | Trayner | G02B 5/32 345/690 |
| 2012/0038634 A1 * | 2/2012 | Cha | H04N 13/0404 345/419 |
| 2012/0044330 A1 * | 2/2012 | Watanabe | G02B 27/2214 348/54 |
| 2012/0127559 A1 * | 5/2012 | Van Der Plas | G09G 3/346 359/291 |
| 2012/0229431 A1 * | 9/2012 | Hiroki | G09F 19/14 345/204 |
| 2012/0249537 A1 * | 10/2012 | Bae | H04N 13/0497 345/419 |
| 2012/0293640 A1 * | 11/2012 | Hirai | G02B 27/0093 348/54 |
| 2012/0299808 A1 * | 11/2012 | Lee | G02B 5/32 345/102 |
| 2013/0022222 A1 * | 1/2013 | Zschau | G03H 1/0808 381/306 |
| 2013/0118904 A1 * | 5/2013 | Dickerson | G01N 27/447 204/547 |
| 2013/0127932 A1 * | 5/2013 | Han | G09G 3/3233 345/691 |
| 2013/0250382 A1 * | 9/2013 | Wiltshire | G03H 1/24 359/23 |
| 2013/0258057 A1 * | 10/2013 | Mishima | G02B 27/2214 348/46 |
| 2013/0286170 A1 * | 10/2013 | Qin | G02B 27/0093 348/59 |
| 2013/0301090 A1 * | 11/2013 | Flynn | G03H 1/20 359/2 |
| 2013/0342572 A1 * | 12/2013 | Poulos | G02B 27/017 345/633 |

(56) References Cited

U.S. PATENT DOCUMENTS

| | | | | |
|---|---|---|---|---|
| 2014/0016051 A1* | 1/2014 | Kroll | ............... | H04N 13/305 |
| | | | | 349/15 |
| 2014/0049507 A1* | 2/2014 | Shepelev | ............ | G06F 3/0412 |
| | | | | 345/174 |
| 2014/0146133 A1* | 5/2014 | Nikonov | ............ | G03H 1/2294 |
| | | | | 348/40 |

FOREIGN PATENT DOCUMENTS

| | | | |
|---|---|---|---|
| KR | 10-2009-0063534 A | 6/2009 | |
| KR | 10-2012-0131561 A | 12/2012 | |
| TW | 200925652 A | 6/2009 | |
| WO | WO-2008093975 A1 * | 8/2008 | ............ G06F 3/044 |

OTHER PUBLICATIONS

Office Action dated Feb. 9, 2017 for German Application No. 10 2013 112 857.2, 7 pages.

Beymer, et al., "Real-Time Tracking of Multiple People Using Continuous Detection," *IEEE Frame Rate Workshop*, 2009, 8 pages.

Comaniciu, et al., "Robust Detection and Tracking of Human Faces with an Active Camera," *Third IEEE International Workshop on Visual Surveillance*, Dublin, Ireland, Jul. 1, 2000, 8 pages.

Darrell, et al., "Integrated person tracking using stereo, color and pattern detection," *International Journal of Computer Vision* 37(2), pp. 175-185.

Haritaoglu, et al., "W$^4$: Real-Time Surveillance of People and Their Activities," *IEEE Transactions on Pattern Analysis and Machine Intelligence* 22(8), pp. 809-830.

Wren, et al., "Pfinder: Real-Time Tracking of the Human Body," *IEEE Transactions on Pattern Analysis and Machine Intelligence* 19(7), pp. 780-785.

* cited by examiner

APPARATUS FOR DISPLAYING A HOLOGRAM

CROSS-REFERENCE TO RELATED APPLICATION

This application claims priority to Republic of Korea Patent Application No. 10-2012-0153826 filed on Dec. 26, 2012 which is incorporated by reference herein in its entirety.

BACKGROUND

Field of the Disclosure

The present disclosure relates to an apparatus for displaying a hologram. Especially, the present disclosure relates to a holography three dimensional display.

Discussion of the Related Art

Recently, many technologies and research for making and reproducing 3D (Three Dimensional) image/video are being actively developed. As the media relating to the 3D image/video is a new concept media for virtual reality, it can improve visual information better, and it will lead the next generation display devices. The conventional 2D image system merely suggests the image and video data projected to plan view, but the 3D image system can provide the full real image data to the viewer. Thus, 3D image/video technologies are the True North image/video technologies.

Typically there are two methods for reproducing 3D image/video; the stereoscopy method and the autostereoscopic method. The stereoscopy method uses the binocular parallax caused by the human two eyes apart from each other. There are typically two types; one is the glasses type and the other is non-glasses type. For the glasses type, the display device displays the left eye image and the right eye image in different polarization directions or in time division manner. The observer can enjoy the 3D images using the polarization glasses or the liquid crystal shutter glasses. However, the glasses type has the disadvantage in that the user should wear the glasses in order to enjoy the 3D images.

For solving this disadvantage, a non-glasses type has been developed. The volumetric display type, one of non-glasses type, can suggest the scope and color information so that the observer can enjoy the 3D images at any positions freely.

To produce a recording of the phase of the light wave at each point in an image, holography method, one of volumetric display type, uses a reference beam, which is combined with the light from the scene or object (the object beam). If these two beams are coherent, optical interference between the reference beam and the object beam, due to the superposition of the light waves, produces a series of intensity fringes that can be recorded on standard photographic film. These fringes form a type of diffraction grating on the film, which is called the hologram. The central goal of holography is that when the recorded grating is later illuminated by a substitute reference beam, the original object beam is reconstructed (or reproduced), producing a 3D image/video.

There has been a new development of the computer generated holography (or CGH) that is the method of digitally generating holographic interference patterns. A holographic image can be generated e.g. by digitally computing a holographic interference pattern and printing it onto a mask or film for subsequent illumination by suitable coherent light source. The holographic image can be brought to life by a holographic 3D display, bypassing the need of having to fabricate a "hardcopy" of the holographic interference pattern each time.

Computer generated holograms have the advantage that the objects which one wants to show do not have to possess any physical reality at all. If holographic data of existing objects is generated optically, but digitally recorded and processed, and brought to display subsequently, this is termed CGH as well. For example, a holographic interference pattern is generated by a computer system and it is sent to a spatial light modulator such as LCSLM (Liquid Crystal Spatial Light Modulator), then the 3D image/video corresponding to the holographic interference pattern is reconstructed/reproduced by radiating a reference beam to the spatial light modulator. FIG. 1 is the structural drawing illustrating the digital holography image/video display device using the computer generated holography according to the related art.

Referring to FIG. 1, the computer 100 generates a holographic interference pattern of an image/video data to be displayed. The generated holographic interference pattern is sent to a SLM 200. The SLM 200, as a transmittive liquid crystal display device, can represent the holographic interference pattern. At one side of the SLM 200, a laser source 300 for generating a reference beam is located. In order to radiate the reference beam 900 from the laser source 300 onto the whole surface of the SLM 200, an expander 400 and a lens system 500 can be disposed, sequentially. The reference beam 900 out from the laser source 300 is radiated to one side of the SLM 200 passing through the expander 400 and the lens system 500. As the result, a 3D image/video corresponding to the holography interference pattern will be reconstructed/reproduced at the other side of the SLM 200.

For the case that the hologram is reproduced based on the LCD device, the pixel pitch of the LCD is too large to view the angle for seeing the hologram correctly. Therefore, the observer only can see the hologram 3D images within a very small view angle.

SUMMARY

An apparatus for displaying hologram images comprises: a hologram display panel that represents light having the hologram images to an observer; a detecting camera that decides a position of the observer; a deflector that forms a prism pattern to refract the light corresponding to the detected position of the observer; and a deflector driver that supplies a driving voltage corresponding to a inclined angle for forming the prism pattern, wherein the deflector includes: a plurality of first electrodes running to a first direction and divided into a plurality of electrode groups; a plurality of connection electrodes running to a second direction crossing with the first direction, and connecting same numbered first electrodes of the electrode groups, wherein each end of the connection electrodes forms a pad portion; and a second electrode facing to the plurality of the first electrodes with a liquid crystal cell therebetween.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
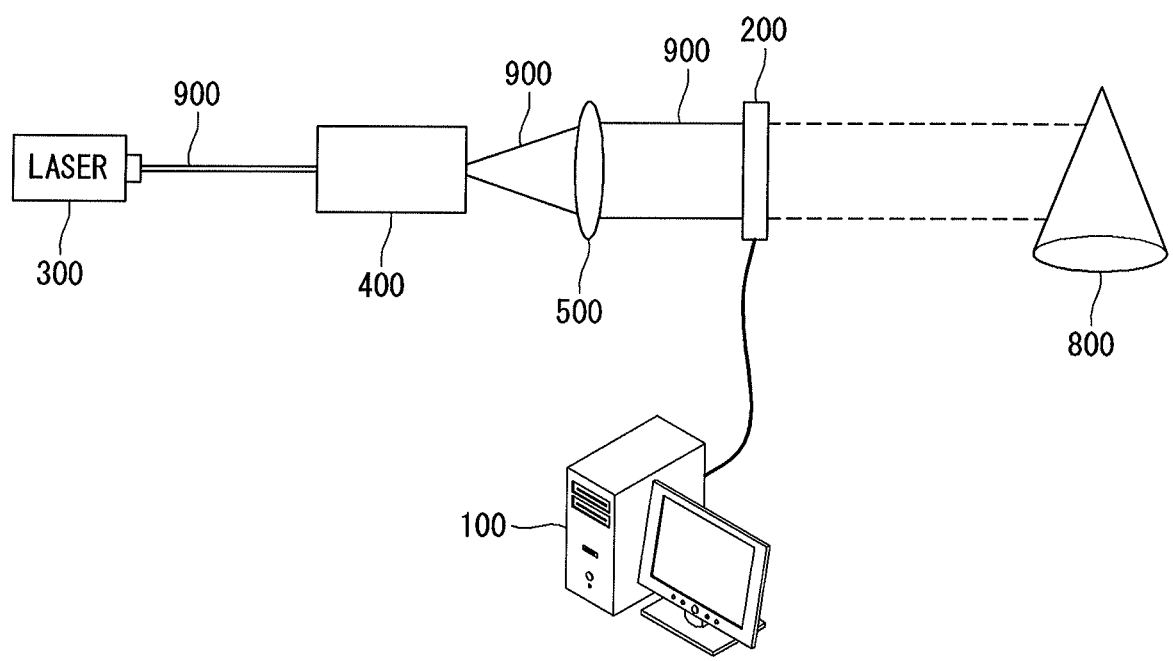
FIG. 1 is the structural drawing illustrating the digital holography image/video display device according to the related art.

Referring to attached figures, preferred embodiments of the present disclosure will be described. Like reference numerals designate like elements throughout the detailed description. However, the present disclosure is not restricted by these embodiments but can be applied to various changes or modifications without changing the technical spirit. In the following embodiments, the names of the elements are selected for ease of explanation and may be different from actual names.

Figure 2:
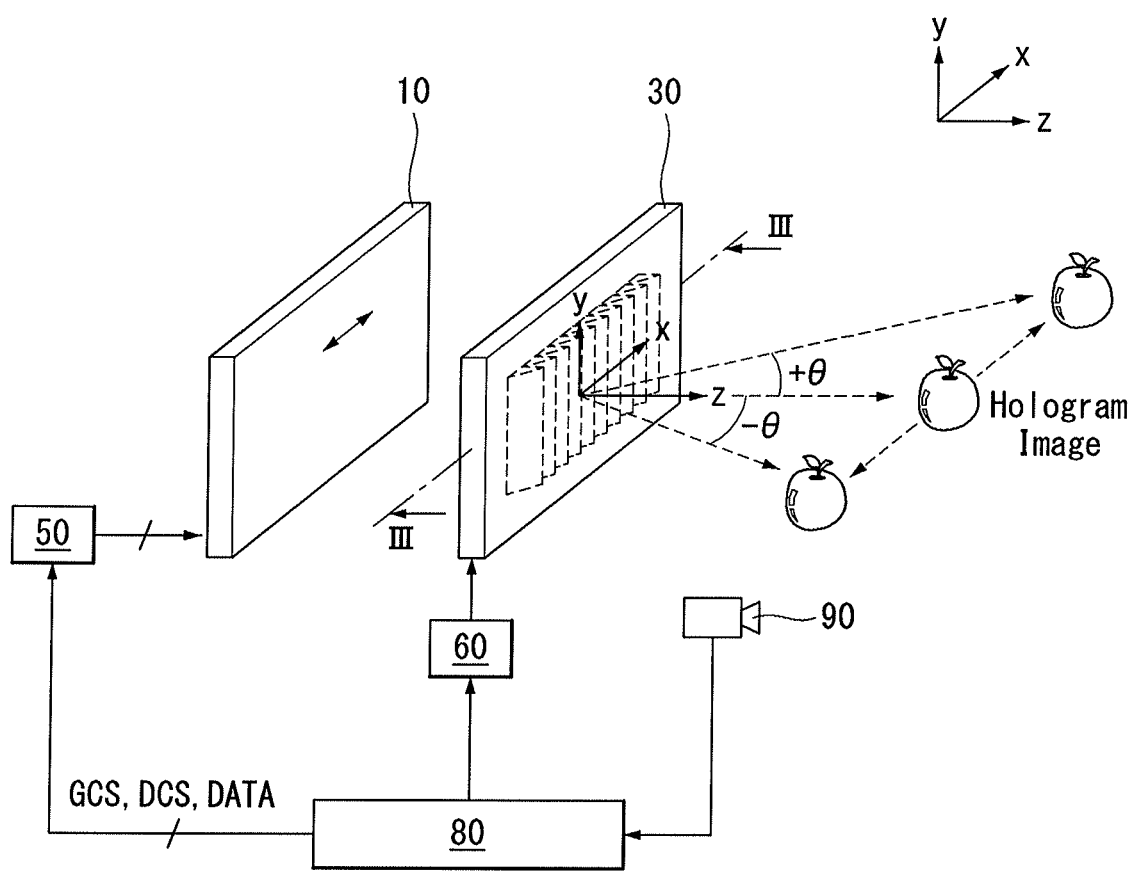
FIG. 2 is a structural drawing illustrating a hologram system according to an exemplary embodiment of the present disclosure.

FIG. 2 is a structural drawing illustrating a hologram system according to an exemplary embodiment of the present disclosure. Referring to FIG. 2, a hologram system according to the present disclosure comprises a hologram display panel 10, a light path deflecting panel 30, a display panel driver 50, a deflecting panel driver 60, a controller 80 and detecting camera 90.

In this embodiment, the hologram display panel 10 may have the similar structure as shown in FIG. 1. For example, the hologram display panel 10 may be made of the transmittive liquid crystal display panel. The hologram display panel 10 may represent the interference fringe patterns by receiving the data relating to the interference fringe patterns from a computer or video processor (not shown in figures). Then, as the collimated light from the laser source disposed at one side of the hologram display panel 10 is radiated to the hologram display panel 10, the hologram images may be displayed the other side from the hologram display panel 10.

On the path of the collimated light is going (+Z axis of FIG. 2), the light path deflecting panel (or 'deflector') 30 may be disposed nest to the hologram display panel 10. The deflector 30 can transmit the light from the hologram display panel 10 as is. Or, it can refract the light to the left side (−θ) or to the right side (+θ) (on the X axis of FIG. 2). Therefore, the hologram images reproduced at distance apart from the hologram display panel 10 may be represented at the left/right shifted position on the horizontal axis (X axis) by the deflector 30.

The hologram display panel driver 50 includes a gate driver and a data driver. The data driver receives the hologram data DATA from the controller 80 and then converts the hologram data DATA to the positive/negative analogue data voltages using the positive/negative gamma compensation voltage supplied from the gamma voltage generator (not shown). The data driver supplies the positive/negative analogue data voltages to the data lines of the hologram display panel 10. The gate driver supplies the gate pulse (or 'scan pulse') synchronized with the data voltage to the gate lines of the hologram display panel 10 sequentially, by the controlling signal from the controller 80.

The deflector driver 60 supplies the driving voltages for controlling the deflector 30 to the deflector 30. The driving voltages can decide the inclined amount of the prism pattern formed at the deflector 30 so that the hologram images can be radiated to a proper position of the user/observer. The driving voltages may be groups of voltages which are linearly increased or decreased for linearly controlling the alignment of the liquid crystal molecules disposed in the liquid crystal cell.

The controller 80 may control the hologram display panel driver 50 for driving the hologram display panel 10. The controller 80 supplies the gate control signal GCS to the gate driver and it supplies the data control signal DCS and the hologram data DATA to the data driver. The gate control signal GCS may include a gate start pulse, a gate shift clock, a gate output enable and so on. The data control signal DCS may include a source start pulse, a source sampling clock, a source output enable, a polarity signal and so on.

The detecting camera 90 takes the pictures of the observer and sends them to the controller 80. The controller 80 analyses the images of the pictures and calculates the position of the observer. The controller 80 compares the detected position of the observer with the reference position to decide the relative position of the observer from the reference position. According to this relative position of the observer, the controller 80 controls the deflector driver 60 to form the prism pattern having proper inclined angle at the deflector 30. For the case that the observer moves to a horizontal direction from the reference position, the deflector driver 60 makes the deflector 30 form a prism pattern for refracting the light to the horizontal direction (along the X axis).

According to the X value of the observer's position, the deflector 30 may changes the refraction angle of the light of the hologram images. For example, when the observer's position has a positive value on the X axis, the deflector 30 may form the first prism pattern to refract the light of hologram images to the +θ direction. On the other hand, when the observer's position has a negative value on the X axis, the deflector 30 may form the second prism pattern to refract the light of hologram images to the −θ direction. In addition, when the difference between the observer's position and the reference position is not larger than the predetermined threshold value, the controller 80 decides that the observer is stay on the reference position. In that case, the deflector 30 does not form any prism pattern so that the light of the holography image is passing through the deflector 30 as it is.

Figure 3:
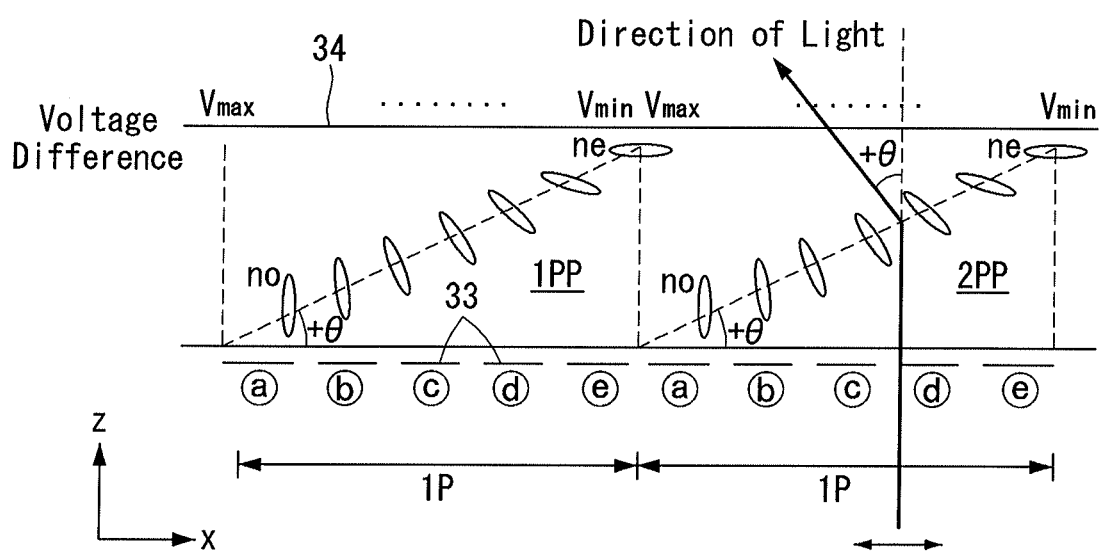
FIGS. 3 and 4 are drawings explaining the principle of the light refraction by the prism pattern formed at the light path deflecting panel.
Figure 4:
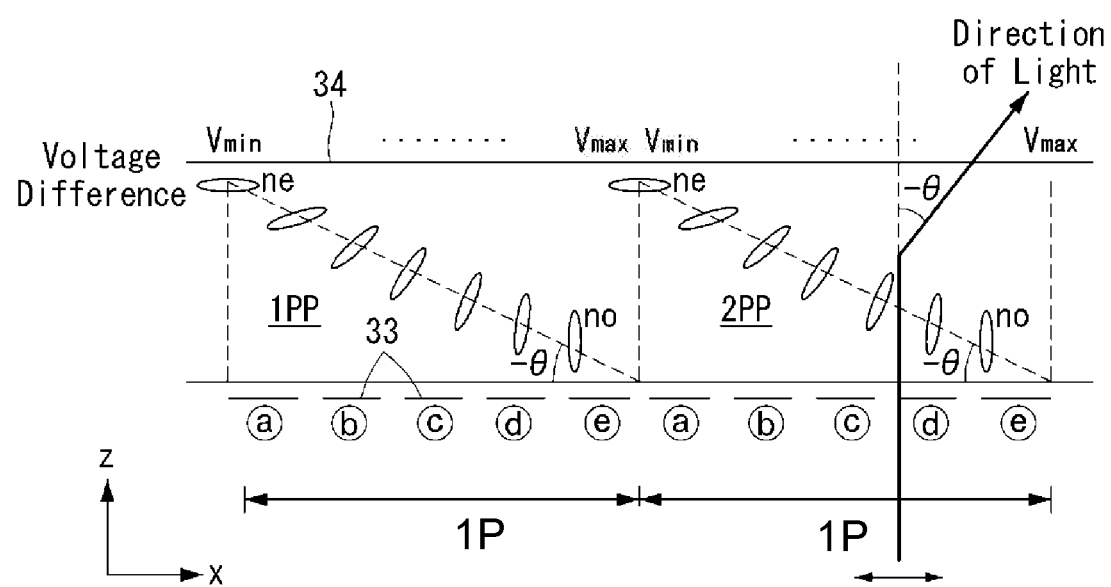

The deflector driver 60 may include a look-up-table (or 'LUT') having the first driving voltage group for transmitting the light as is, the second driving voltage group for refracting the light to +θ direction, and the third driving voltage group for refracting the light to −θ direction. In this case, responding to the controlling signal from the controller 80, the deflector driver 60 may output any selected one of the first to third driving voltage groups. Here, the look-up-table may include a plurality of the second driving voltage groups and a plurality of the third driving voltage groups in order that the prism pattern may have various inclined angles for corresponding to the various positions of the observer Hereinafter, referring to FIGS. 3 and 4, we will explain about the various prism patterns of the light path deflecting panel, the deflector. FIG. 3 illustrates the prism pattern for refracting the light to the +θ direction, and FIG. 4 illustrates the prism pattern for refracting the light to the −θ direction.

As shown in figures, in the ECB mode, the prism pattern 1PP and 2PP can be represented by controlling the alignment direction of the liquid crystal molecules. In the ECB mode, the liquid crystal molecules can have any direction angle between the horizontal state (X axis on the FIGS. 3 and 4) to the surface of the substrate and the vertical state (Z axis on the FIGS. 3 and 4) to the surface of the substrate. In the ECB mode, when the liquid crystal molecules are aligned to the vertical direction to the surface of the substrate, the refraction ratio, no, is the minimum value. When the liquid crystal molecules are aligned to the horizontal direction to the surface of the substrate, the refraction ratio, ne, is the maximum value. As the light from the hologram display panel 10 is horizontally polarized, the refraction ratio of this polarized light may be changed according to the alignment direction of the liquid crystal molecules of the deflector 30. When the horizontally polarized light is passing through the vertically aligned liquid crystal molecules, the refraction ratio may be the minimum value, no. When the horizontally polarized light is passing through the horizontally aligned liquid crystal molecules, the refraction ratio may be the maximum value, ne.

By controlling the aligned directions of the liquid crystal molecules included in one pitch 1P of the prism pattern 1PP and 2PP as to be progressively changed from vertical state to the horizontal state along to the +X axis, it is possible to make a prism pattern having the inclined angle of +θ, as shown in FIG. 3. By controlling the aligned direction of the liquid crystal molecules along to the −X axis, it is possible to make a prism pattern having the inclined angle of −θ, as shown in FIG. 4.

At first, in the case the prism pattern has the inclined angle of +θ, as shown in FIG. 3, the first electrodes 33 are supplied with the second driving voltage including the gradually decreased voltages along to the +X axis. To the second electrode 34, a ground or reference voltage may be supplied. For example, 5 first electrodes 33 are disposed within the one pitch 1P of the first prism pattern 1PP; along to the +X axis, ⓐ electrode, ⓑ electrode, ⓒ electrode, ⓓ electrode and ⓔ electrode are disposed. The V1 voltage is supplied to the ⓐ electrode, the V2 voltage is supplied to the ⓑ electrode, the V3 voltage is supplied to the ⓒ electrode, the V4 voltage is supplied to the ⓓ electrode and the V5 voltage is supplied to the ⓔ electrode. Here, these 5 voltages should be gradually decreased that is, the relations between them would be V1>V2>V3>V4>V5.

Further, in the case the prism pattern has the inclined angle of −θ, as shown in FIG. 4, the first electrodes 33 are supplied with the third driving voltage including the gradually increased voltages along to the +X axis. To the second electrode 34, a ground or reference voltage may be supplied. For example, 5 first electrodes 33 are disposed within the one pitch 1P of the first prism pattern 1PP; along to the +X axis, as mentioned above. Here, these 5 voltages should be gradually increased, that is, the relations between them would be V1<V2<V3<V4<V5.

When the observer is on the reference position, the liquid crystal molecules are in the initial aligned condition. That is, no electric power is supplied to the first electrodes. In the ECB mode, when no electric field is supplied to the liquid crystal cell, all liquid crystal molecules are aligned in the initial alignment direction, horizontal direction. In that case, the refraction ratios of the liquid crystal cells have the same value, ne. Therefore, the horizontally polarized light from the hologram display panel 10 would transmit the deflector 30 without any refraction.

In the deflector 30 as mentioned above, the first electrodes 33 supplied with the driving voltages should be disposed having 2 micrometer (µm) gap at most. Forming the first electrodes 33 having the fine pitch like this, the neighboring first electrodes 33 may be shorted each other, or any first electrode 33 may be broken (disconnected).

Figure 5:
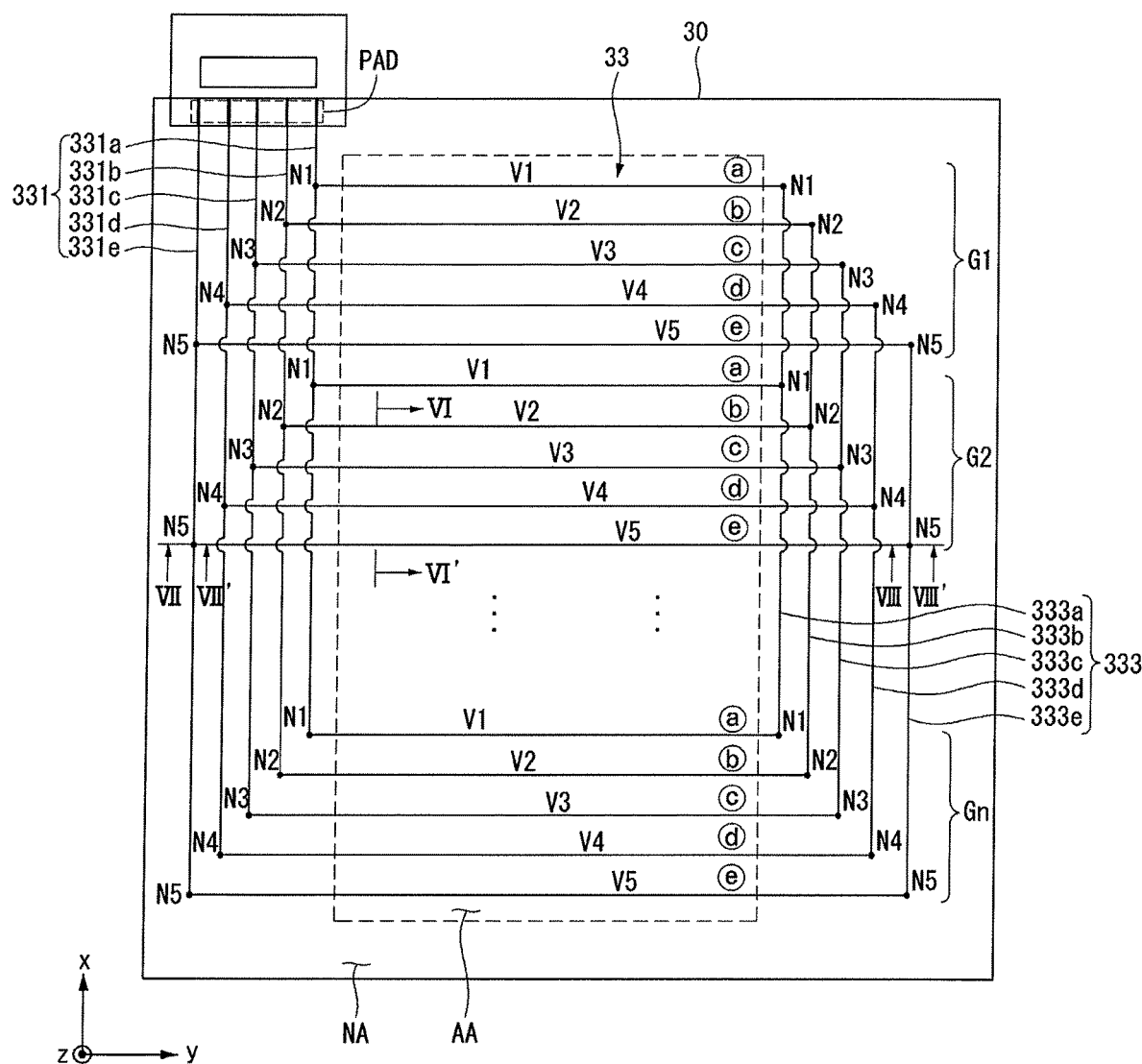
FIG. 5 is a plan view illustrating the array structure of the first electrodes of the light path deflecting panel.

Considering these problems, in the present disclosure, the first electrodes may be formed as shown in FIG. 5. FIG. 5 is a plan view illustrating the array structure of the first electrodes of the light path deflecting panel (deflector).

Referring to FIG. 5, the first electrodes 33 are disposed in horizontal direction across the substrate. Two neighboring first electrodes are apart 2 micrometer (µm) at most from each other. In order to form the prism patterns 1PP and 2PP, a plurality of the first electrodes 33 is included in one group. As shown in FIG. 5, the each of the first electrode group G1, G2, . . . Gn includes 5 first electrodes. For example, the first group G1 includes ⓐ electrode, ⓑ electrode, ⓒ electrode, ⓓ electrode and ⓔ electrode. The voltages of V1, V2, V3, V4 and V5 are supplied to the 5 first electrodes, respectively. Similarly, the second group G2 includes ⓐ electrode, ⓑ electrode, ⓒ electrode, ⓓ electrode and ⓔ electrode. That is, in the present disclosure, all first electrodes are grouped in n groups G1, G2, . . . Gn. Each group has 5 first electrodes.

The deflector (light path deflecting panel) 30 can be divided into two areas; the one is display area AA and the other is non-display area NA. One end of one first electrode 33 is connected to one end of other first electrode 33 by the connection electrode 331 in the non-display area NA. In this embodiment, the connection electrode 331 includes the first connection electrode 331a to the fifth connection electrode 331e.

The first connection electrode 331a is running across the panel along the X axis crossing the first electrodes 33. One end of the first connection electrode 331a is extended to one end of the panel to form a pad portion PAD. The first connection electrode 331a is connected to ⓐ electrode of each group via the first node N1.

The second connection electrode 331b is disposed as being parallel and neighbored with the first connection electrode 331a. One end of the second connection electrode 331b is extended to the one end of the panel to form the pad portion PAD. The second connection electrode 331b is connected to ⓑ electrode of each group via the second node N2.

The third connection electrode 331c is disposed as being parallel and neighbored with the second connection electrode 331b. One end of the third connection electrode 331c is extended to the one end of the panel to form the pad portion PAD. The third connection electrode 331c is connected to ⓒ electrode of each group via the third node N3.

The fourth connection electrode 331d is disposed as being parallel and neighbored with the third connection electrode 331c. One end of the fourth connection electrode 331d is extended to the one end of the panel to form the pad portion PAD. The fourth connection electrode 331d is connected to ⓓ electrode of each group via the fourth node N4.

The fifth connection electrode 331e is disposed as being parallel and neighbored with the fourth connection electrode 331d. One end of the fifth connection electrode 331e is extended to the one end of the panel to form the pad portion PAD. The fifth connection electrode 331e is connected to ⓔ electrode of each group via the fifth node N5.

In addition, all (a) electrodes of each group are connected via the first connection line 333a. All (b) electrodes of each group are connected via the second connection line 333b. All (c) electrodes of each group are connected via the third connection line 333c. All (d) electrodes of each group are connected via the fourth connection line 333d. All (e) electrodes of each group are connected via the fifth connection line 333e.

At the non-display area NA, one end of the $n^{th}$ first electrode 33 is connected to the same $n^{th}$ first electrodes 33 of other group by the connection electrode 331. The connection electrodes 331 form the pad portion PAD at one end side of the substrate. Further, the other end of the $n^{th}$ first electrode 331 is connected to the same $n^{th}$ first electrode 33 of other group by the connection line 333.

To the pad portion PAD, a conductive flexible film, such as COF (Chip On Film) on which IC package is mounted, may be attached to connect the connection electrode 331 to the driver IC. The driving voltages may be supplied to the (a) electrode, the (b) electrode, the (c) electrode, the (d) electrode and the (e) electrode included in each group G1, G2, ... Gn via the IC package and the connection electrode 331. As the first connection electrode 331a is connected to all (a) electrodes of all groups via the first node N1, V1 voltage received from the IC package can be supplied to all (a) electrodes.

Further, as all (a) electrodes are also connected via the first connection line 333a, even though if any one (a) electrode is not connected to the connection electrode 331a, that is if any first node N1 is failed, the voltage V1 can be supplied to the disconnected (a) electrode via the first connection line 333a.

As the same $n^{th}$ first electrodes of all group are connected each other, the number of the IC package can be minimized. If not, each first electrode should have its own channel for IC package, so that the IC package's number may be equal to or larger than the integer number of (the number of the first electrode)/(number of channel per IC package). However, according to the present disclosure, only one IC package having 5 channels would be enough.

In the above embodiment, each group of the first electrodes is driven with the same driving voltages. However, each group may be driven by different driving voltages. In this case, other IC packages may be required for supplying different driving voltages and the groups using the same driving voltages may be connected same IC package.

In addition, the first electrodes 33 disposed in the display area AA may be made of a transparent conductive electrode. The connection electrode 331 and the connection line 333 disposed in the non-display area NA may be made of metal electrode. In that case, the transparent conductive electrode and the metal electrode are formed at different layers, respectively having an insulating layer therebetween. Then, they can be electrically connected each other via contact hole formed at the non-display area. This structure will be explained referring to FIGS. 6 and 7.

Figure 6:
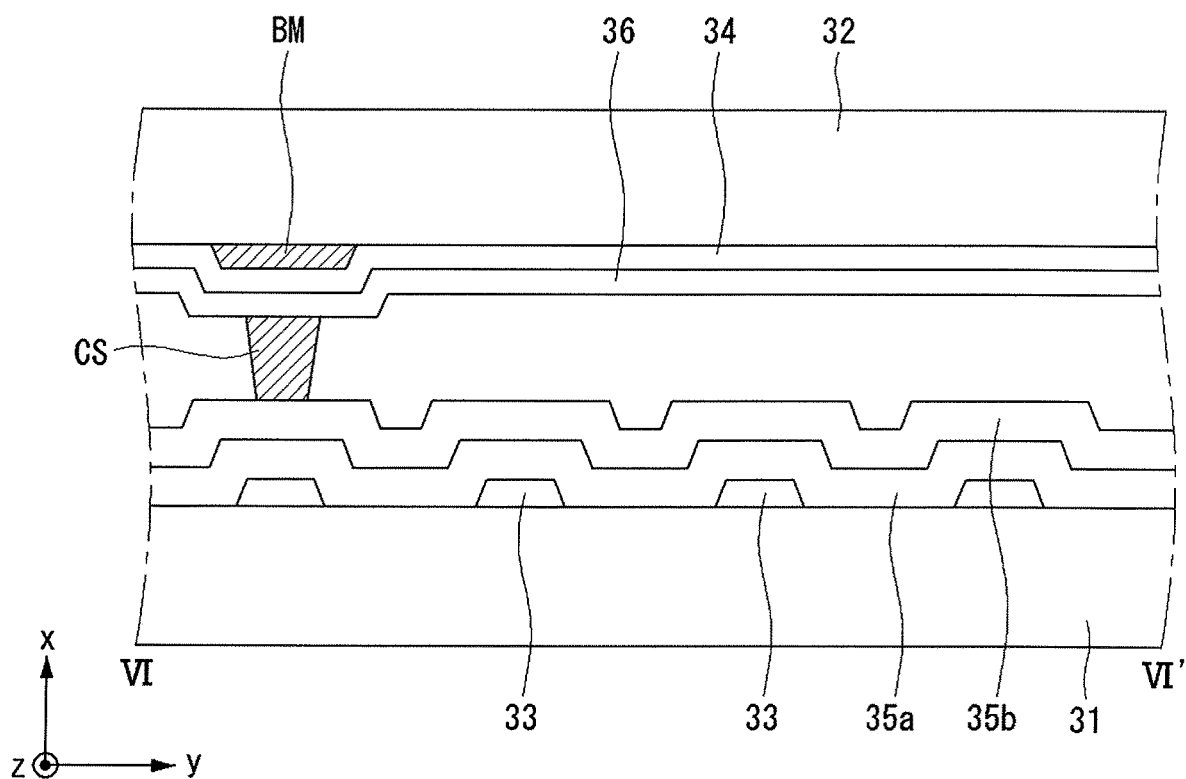
FIG. 6 is a cross sectional view along the cutting line VI-VI' of FIG. 5.

FIG. 6 is a cross sectional view along the cutting line VI-VI' in the display area AA of FIG. 5. In FIG. 6, the deflector 30 includes a first substrate 31, a second substrate 32 and a liquid crystal cell disposed between the first substrate 31 and the second substrate 32.

The first substrate 31 facing with the hologram display panel 10 may be made of a transparent plastic substrate or a glass substrate. The first substrate 31 is disposed at the light incident side of the deflector 30. On the first substrate 31, a plurality of first electrodes 33 are formed. The first electrode 33 may be formed by depositing a transparent conductive material such as indium-tin-oxide (ITO) or indium-zinc-oxide (IZO) and patterning it through the photolithography method. The first electrodes 33 may be a line pattern running along to one direction of the first substrate 31. The neighboring first electrodes 33 are apart with predetermined distance from each other and disposed in parallel.

In FIG. 6, the first electrodes 33 are running along to the Z axis in parallel each other. For example, the direction of Z axis is perpendicular to the polarization direction of the light from the hologram display panel 10. A first insulating layer 35a and a second insulating layer 35b are deposited on the first electrodes 33. The first and second insulating layers 35a and 35b may include the silicon nitride SiNx or the silicon oxide SiOx.

The second substrate 32 may be made of a transparent plastic substrate or a glass substrate, like the first substrate 31. The second substrate 32 is disposed at the light radiated side of the deflector 30.

On the second substrate 32, a second electrode 34 is formed. Unlike the first electrodes 33, the second electrode 34 is formed as one body by depositing a conductive material on the whole surface of the second substrate 32. The second electrode 34 can be made of the transparent conductive materials including indium-tin-oxide (ITO) or indium-zinc-oxide (IZO), for transmitting the light. On the second electrode 34, a third insulating layer 36 is deposited to protect the second electrode 34. The third insulating layer 36 may include the silicon nitride SiNx or the silicon oxide SiOx.

Between the first substrate 31 and the second substrate 32, a plurality of column spacers CS are disposed for keeping the cell gap, the joining distance between the first substrate 31 and the second substrate 32, evenly. Over the spacer CS, black matrixes BM is disposed for preventing the light from being reflected by the column spacers CS or being recognized by any observer.

Figure 7:
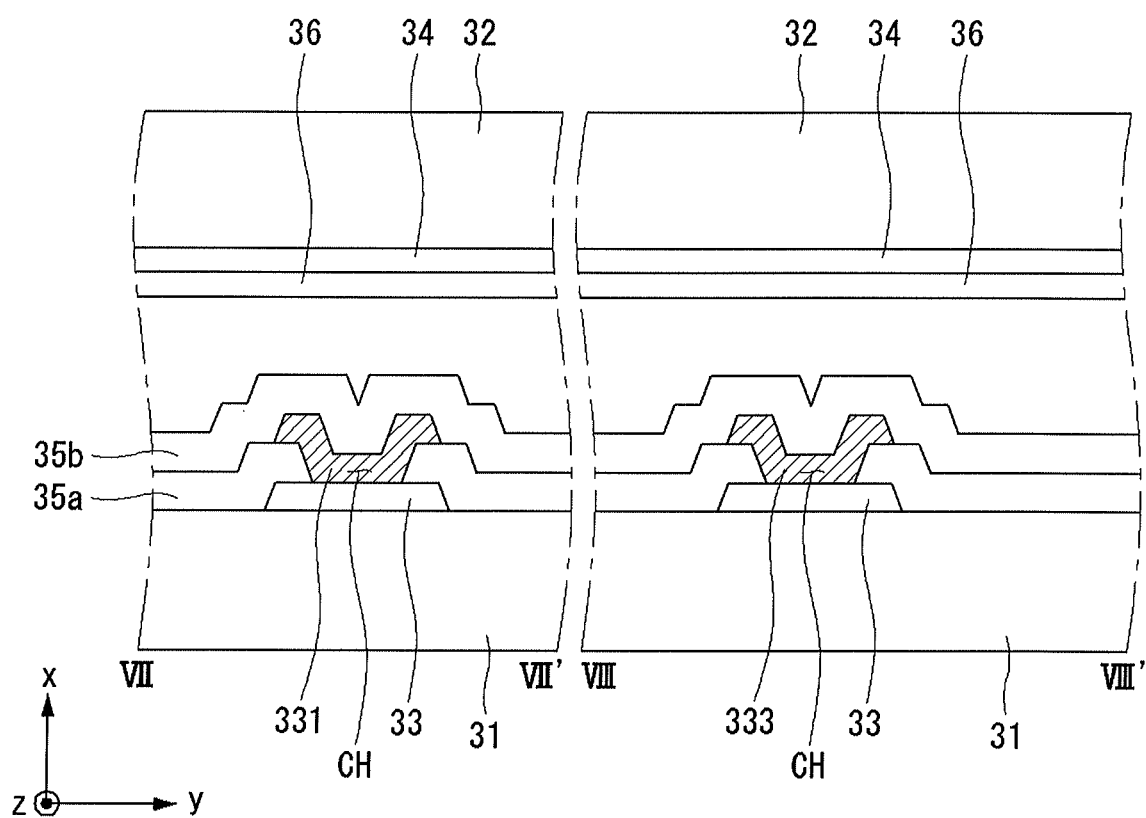
FIG. 7 is a cross sectional view along the cutting line VII-VII' and VIII-VIII' of FIG. 5.

FIG. 7 is a cross sectional view along the cutting line VII-VII' and VIII-VIII' of FIG. 5. FIG. 7 illustrates the structure of the node connecting between the metal connection electrode 331 and the transparent first electrode 33 or between the connection line 333 and the transparent first electrode 33.

The transparent first electrode 33 is formed on the first substrate 31. Over the transparent first substrate 33, the first insulating layer 35a is deposited. Some portions of the transparent first electrode 33 are exposed through the first contact hole CH. The metal connection electrode 331 or the metal connection line 333 is formed over the exposed first electrode 33 so that the first electrode 33 can be connected to the connection electrode 331 or to the connection line 333. Over the first insulating layer 35a, the second insulating layer 35b may be further deposited.

The liquid crystal cell LC disposed between the first substrate 31 and the second substrate 32 may include the ECB (Electrically Controlled Birefringence) mode liquid crystal material.

Figure 8:
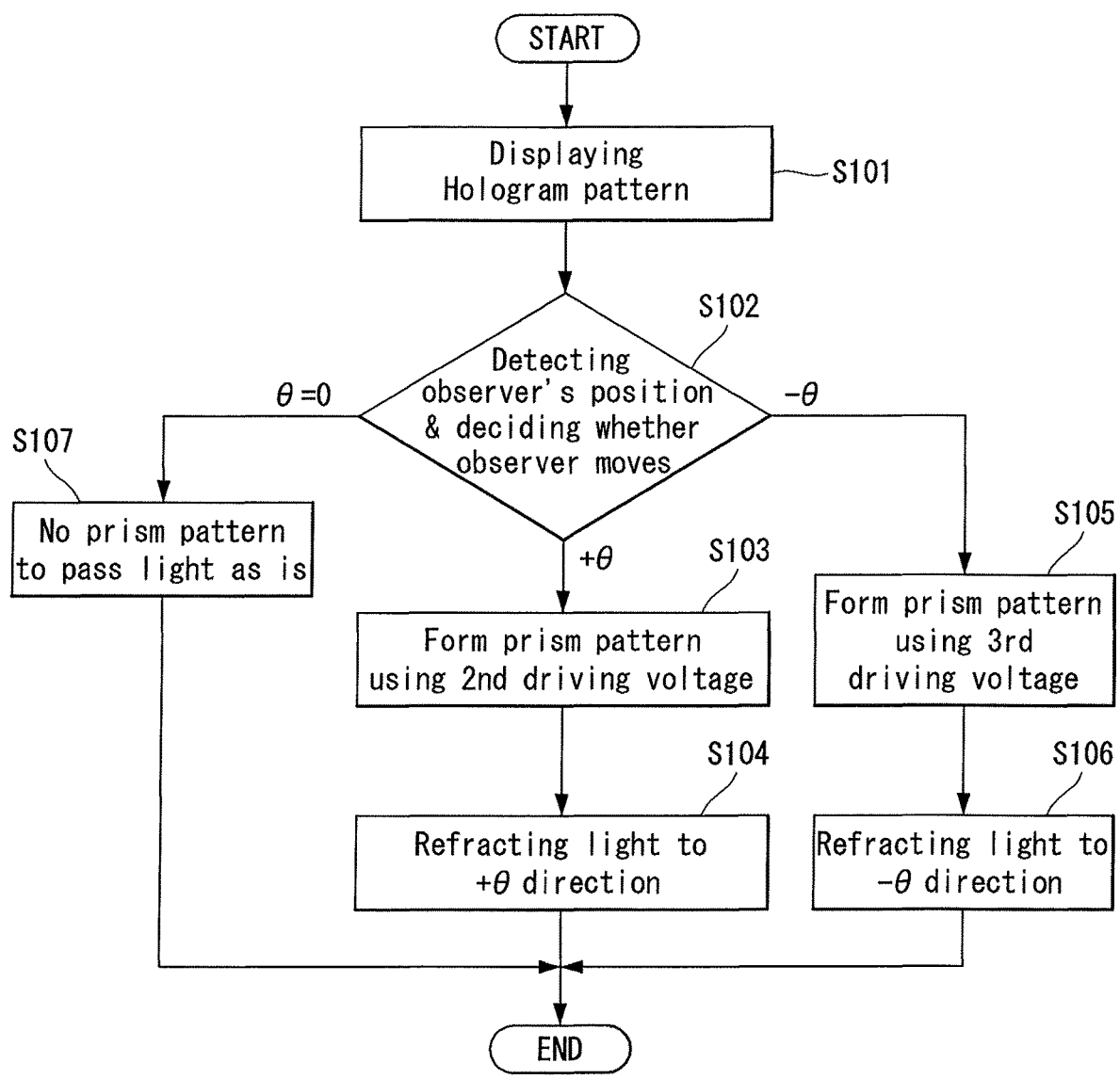
FIG. 8 is a drawing explaining one method for driving the hologram display according to the present disclosure.

FIG. 8 is a drawing explaining one method for driving the hologram display according to the present disclosure.

Referring to FIG. 8, at the step S101, the hologram display panel 10 receives the hologram pattern data and displays hologram pattern to represent the hologram images.

At the step S102, the detecting camera 90 takes pictures of the observer and sends the picture images to the controller 80. The controller 80 analyzes the picture images to calculate the coordination of the observer's position. The controller 80 compares the calculated coordination of the observer's position with the coordination of the reference position to decide the relative coordination of the observer's position. If the observer's position is shifted to +θ from the reference position, the controller 80 sends the second driving voltage corresponding to the observer's position to the light path deflecting panel (or 'deflector') 30. The deflector 30 forms a prism pattern to refract the light from the hologram display panel 10 to the correct position of the observer.

According to the moved position of the observer, that is, it is shifted to +θ or −θ, the deflector 30 forms different prism pattern to refract the light properly. For example, when the observer moves to +θ direction, the deflector 30 may form the prism pattern as shown in FIG. 4 to refract the light to +θ. When the observer moves to −θ direction, the deflector 30 may form the prism pattern as shown in FIG. 5 to refract the light to −θ. Therefore, the hologram 3D images can be radiated to the proper position of the observer, as shown at the steps S103 to S106.

In other hand, at the step S107, when the movement of the observer's position by detecting and calculating the position of the observer is less than a predetermined threshold value, it is decided as the observer has not moved. The deflector 30 may not form any prism pattern so that the light from the hologram display panel 10 may pass the deflector 30 as is.

As mentioned above, in one embodiment of the present disclosure, the light path deflecting panel (or 'deflector') 30 may be disposed between the hologram display panel 10 and the observer. The deflector 30 can form various prism patterns corresponding to the left or right shifting amount of the observer's position. As a result, the deflector 30 can control the direction of the light for representing the hologram images. According to the present disclosure, as the hologram images can follow the varied position of the observer, it is possible to enjoy the hologram images, even though the observer moves out of view angle of the hologram image system having the narrow view angle.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for displaying hologram images, comprising:
    a hologram display panel that represents light having the hologram images to an observer;
    a detecting camera configured to acquire images of the observer;
    a light path deflecting panel, including:
        a plurality of first electrodes extending in a first direction and divided into a plurality of first electrode groups in a display area of the light path deflecting panel, each first electrode group corresponding to a pitch distance of the light path deflecting panel and including a same number of first electrodes;
        a plurality of connection electrodes extending in a second direction crossing with the first direction in a non-display area of the light path deflecting panel, wherein one end of each of the connection electrodes forms a pad portion at one end side of a substrate, each of the connection electrodes connected to first ends of corresponding first electrodes of each of the plurality of first electrode groups;
        a plurality of connection lines extending in a second direction crossing with the first direction in a non-display area of the light path deflecting panel, wherein another end of each of the connection electrodes forms a pad portion at another end side of the substrate, each of the connection lines connected to second ends of corresponding first electrodes of each of the plurality of first electrode groups; and
        a second electrode facing the plurality of the first electrodes with a liquid crystal cell therebetween;
    wherein the plurality of connection lines is positioned in the non-display area of the light path deflecting panel,
    wherein the second end is opposite to the first end of the first electrodes in the non-display area of the light path deflecting panel, and
    wherein one first electrode of the first electrode groups, one connection line of the connection line groups and one connection electrode of the connection electrodes groups are connected in a closed loop shape.

2. The apparatus according to the claim 1, wherein the first electrodes include a transparent conductive material and the connection electrodes include metal material.

3. The apparatus according to the claim 2, wherein the light path deflecting panel further includes: a first substrate and a second substrate facing to each other with the liquid crystal cell therebetween,
    wherein the first electrodes are disposed on the first substrate, a first insulating layer is deposited on the first electrodes, the connection electrodes are disposed on the first insulating layer, and a second insulating layer is deposited over the connection electrodes,
    wherein the second electrode is disposed on the second substrate, and a third insulating layer is deposited on the second electrode, and
    wherein the light path deflecting panel has the display area and the non-display area surrounding the display area, and the connection electrodes are connected to the corresponding first electrodes through contact holes that penetrate the first insulating layer and expose portions of the first electrodes, at the non-display area.

4. The apparatus of claim 1, wherein a driving voltage applied each of the plurality of connection electrodes is selected between monotonically increasing or monotonically decreasing with connection electrode number to yield a ramp voltage pattern on the first connection electrodes within each pitch distance of the light path deflecting panel to produce refraction and zero voltage for no refraction.

5. The apparatus of claim 1, further comprising a light path deflecting panel driver that includes a look-up table having a plurality of groups of driving voltages, each of the groups of driving voltages including driving voltages to be supplied to the light path deflecting panel at corresponding calculated positions of the observer.

6. The apparatus of claim 1, wherein adjacent first electrodes are spaced apart from one another by a distance of less than 2 micrometers.

7. The apparatus of claim 1, wherein the plurality of connection electrodes and the plurality of connection lines are positioned in the non-display area of the light path deflecting panel.

8. The apparatus of claim 3, wherein each of the first insulating layer and the second insulating layer includes at least one of silicon nitride or silicon oxide.

* * * * *